Figure 1:
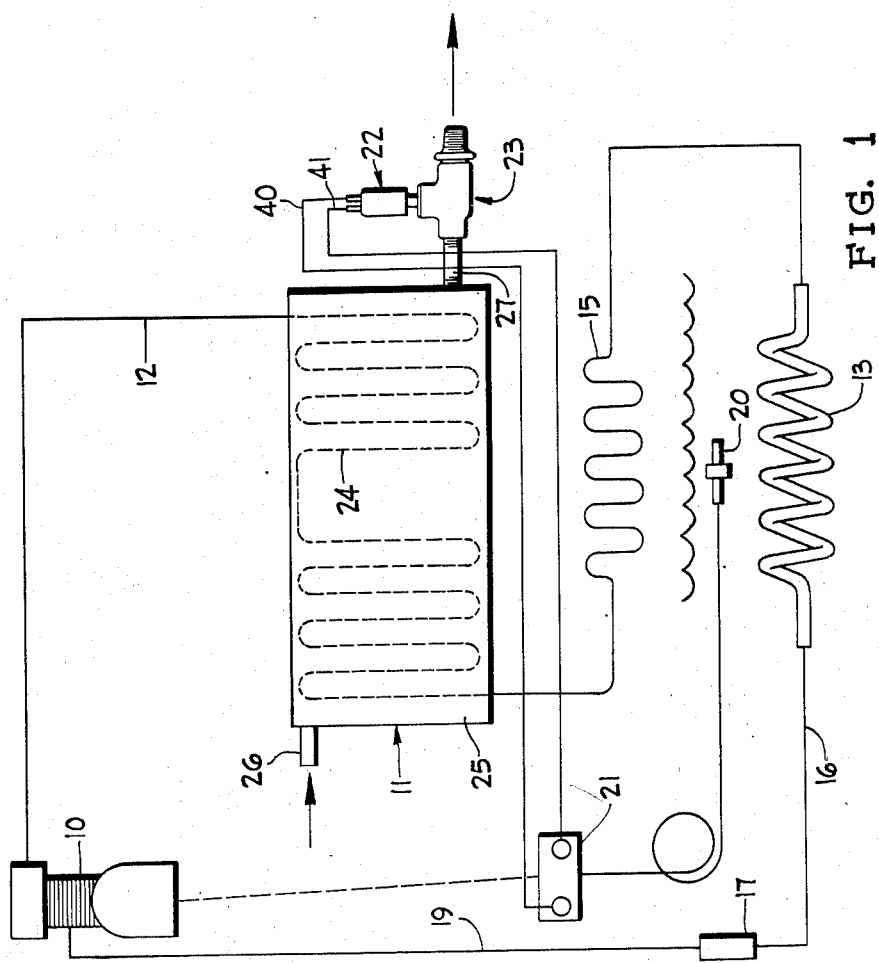

April 16, 1957

E. J. KRAFT 2,788,639

CONDENSER VALVE

Filed Feb. 28, 1955

2 Sheets-Sheet 1

INVENTOR
ELROY J. KRAFT

BY
ATTORNEYS

April 16, 1957     E. J. KRAFT     2,788,639
CONDENSER VALVE

Filed Feb. 28, 1955     2 Sheets-Sheet 2

INVENTOR
ELROY J. KRAFT

BY     Hill, Sherman, Meroni, Gross & Simpson     ATTORNEYS

United States Patent Office 2,788,639
Patented Apr. 16, 1957

2,788,639

CONDENSER VALVE

Elroy J. Kraft, Des Plaines, Ill., assignor to The Dole Valve Company, Chicago, Ill., a corporation of Illinois Application February 28, 1955, Serial No. 490,716

12 Claims. (Cl. 62—3)

This invention relates to improvements in systems for controlling the flow of a cooling medium for a condenser in a refrigerating system, and to valves therefor.

A principal object of my invention is to provide a refrigerating system in which the temperature of the condenser is controlled by the temperature at the evaporator and the temperature of the cooling fluid passing through the condenser.

Another object of my invention is to provide a simplified system and means for controlling the head pressures of the compressor of a refrigerating system by controlling the flow of coolant for the condenser of the refrigerating system in accordance with condenser temperatures.

A further object of my invention is to provide a cooling system for the condensers of refrigerating systems in which a valve dependent upon evaporator temperature controls the flow of coolant through the condenser, and a second valve dependent upon the temperature of the coolant effects an increase in the rate of flow through the condenser and thus controls the head pressures of the refrigerating compressor.

A further object of my invention is to provide a control valve controlling the flow of coolant in which a thermal element subject to one temperature effects the flow of coolant at one rate, and a second valve subject to the temperature of the coolant, by-passes the first valve and increases the rate of flow of coolant in accordance with cooling requirements.

A further object of my invention is to provide a valve for controlling the flow of coolant through a liquid cooled condenser in which a solenoid operated valve opening in response to evaporator temperature effects the flow of a uniform volume of coolant along the condenser and a temperature operated valve having a thermal responsive element on the downstream side of the first valve, increases the rate of flow of coolant through the condenser in accordance with the temperature of the condenser.

Another and more detailed object of my invention is to provide a coolant control valve for the condenser of a water cooled refrigerating system in which a solenoid energized in accordance with evaporator temperatures operates to accommodate the flow of a substantially uniform volume of coolant through the condenser regardless of pressure variations at the source, and a thermostatic element seated on the downstream side of the solenoid operated flow control valve serves to increase the flow of coolant through the condenser in accordance with temperature and pressure requirements.

Figure 2:
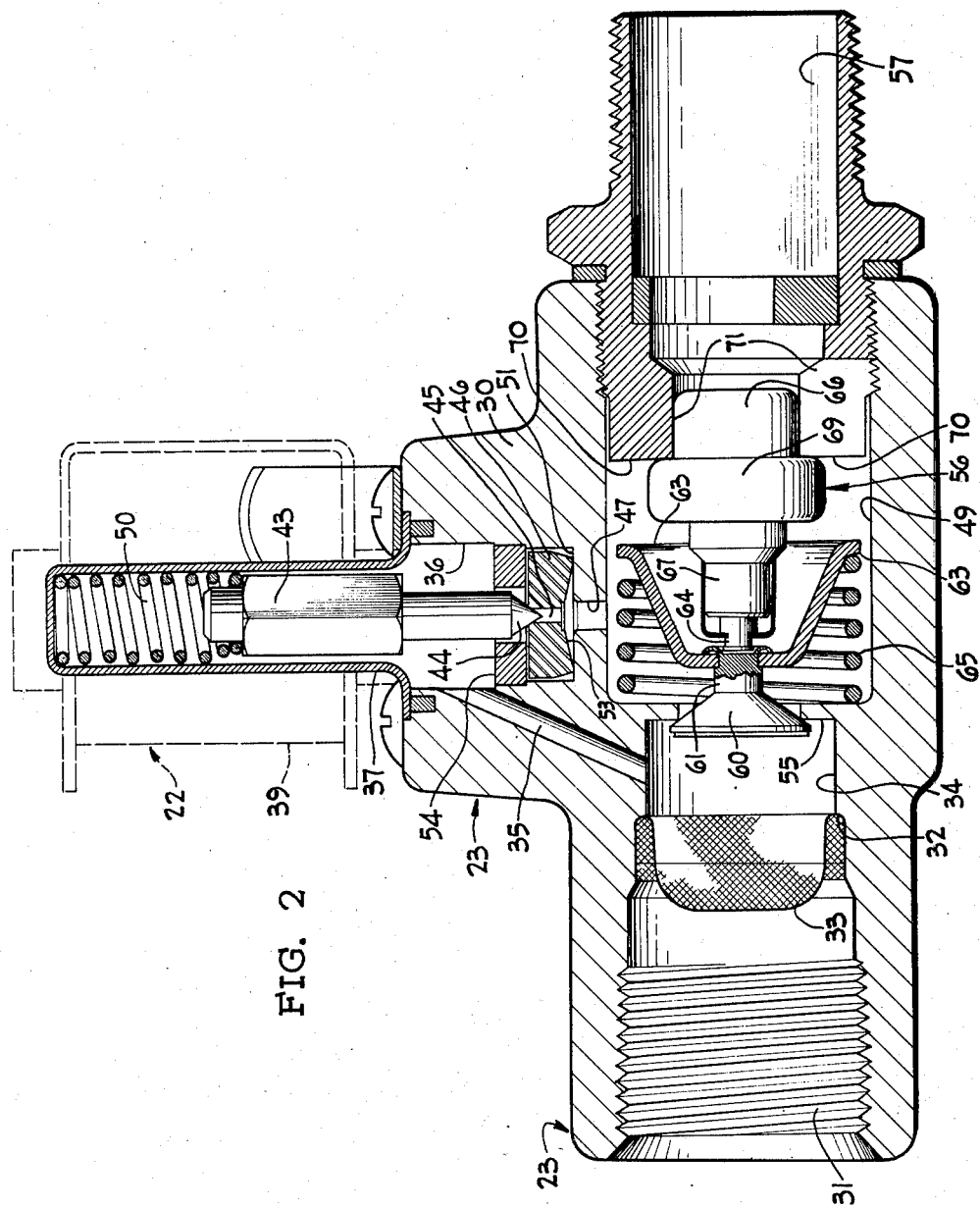

These and other objects of my invention will appear from time to time as the following specification proceeds and with reference to the accompanying drawings wherein:

Figure 1 is a circuit diagram of a water cooled refrigerating system having a coolant control valve constructed in accordance with my invention connected at the outlet end of the cooling chamber for the condenser; and Figure 2 is a longitudinal sectional view taken through the valve shown in Figure 1.

In Figure 1 of the drawings, I have shown a typical refrigerating system in which a motor driven compressor 10 serves to compress a suitable refrigerant, such as, Freon or a like gas and supply the same to a water cooled condenser 11 through a pressure line 12. From the condenser, the refrigerant, condensed to a liquid, passes to an evaporator or cooling coils 13 through a capillary tube 15, which serves to restrict the liquid refrigerant in its passage to the evaporator and cooling coils, where heat is absorbed from the room air at the evaporator to be later dissipated in the outside air at the condenser. The gas then passes through a return line 16 to a receiver 17 and from said receiver passes to the suction end of the compressor 10 through a suction line 19, as is usual in most closed circuit refrigerating systems used for domestic purpose.

As herein shown, the cooling coils 13 are immersed in water and a thermal element 20 is shown as being immersed in the water adjacent the cooling coils 13 for operating a thermostatic switch 21 controlling the energization of a solenoid 22 of a coolant control valve 23.

The thermal element 20 and thermostatic switch 21 are known as an ice bank control and are of well known constructions commonly used in refrigerating systems, so need not herein be shown or described in detail.

It should here be understood that while the cooling coils 13 and the thermal element 20 are shown as being immersed in water, that said cooling coils need not be immersed in water, but may be in direct contact with the atmosphere, if desired.

The water cooled condenser 11 is shown as comprising the usual condensing coils 24 within a tank 25 for cooling water. Said tank has an inlet 26 leading thereinto and an outlet pipe 27 leading therefrom. The valve 23 is threaded or otherwise secured to the outlet 27.

The valve 23 is shown as comprising a valve body 30 having an inlet 31 leading thereinto and shown in Figure 1 as being threaded on the end of the pipe 27. Inwardly of the threaded portion of the inlet 31 is a shoulder 32 abutted by an inlet screen 33. The inlet screen 33 is a well known form of screen commonly used in valves and is of a generally hat-like construction, held within the inlet 31 by abutting engagement with the shoulder 32. On the downstream side of the shoulder 32 is a valve chamber 34 having a by-pass passageway 35 leading from the wall thereof and having communication with a chamber 36 opening to the outside of the valve body and closed by an elongated end closure cap 37, forming a support for an electromagnetic coil 39 for the solenoid 22 on the outside thereof, and a guide for an armature 43 for the solenoid on the inside thereof. The coil 39 is energized by conductors 40 and 41, connected with the thermal switch 21 and energized through a suitable circuit (not shown) connected with a source of current supply when the switch 21 is closed and the temperature of the cooling coils or evaporator 13 reaches a predetermined value.

The armature 43, guided within the end cap 37 has a conical valve 44 formed on its inner end, engageable with an orifice 45 of a flow control washer 46 forming a seat for said valve. The flow control washer 46 also forms a flow control for supplying a uniform volume of coolant through a reduced diameter passageway 47 to a thermostatic chamber 49 regardless of variations in pressure of the coolant at the source.

The valve 44 forms a pilot valve for the liquid coolant and is biased in a direction to close the orifice 45 by means of a compression spring 50 seated on the armature 43 at one end and on the end of the end cap 37 at its opposite end.

The flow control member 46 is shown as being seated against a shoulder 51, terminating into the passageway 47 and having an inwardly recessed or contoured downstream face 53, engaging the shoulder 51 adjacent its edge and flexing downwardly into engagement with said shoulder upon increases in pressure thereupon, to reduce the cross-sectional area of the orifice 45 and equalize the flow therethrough in accordance with pressure variations, as in the Kempton Patent No. 2,454,929, which issued on November 30, 1948, and is no part of my present invention so need not herein be shown or described further. A retaining washer 54 is shown as being seated against a shouldered portion of the passageway 36 on the upstream side of the flow washer 46, for retaining said washer in the passageway 36 into position to engage the shoulder 51.

The chamber 34 is separated from the thermostatic chamber 49 by an annular flange or shoulder 55, the inner margin of which forms a port for by-passing coolant past the valve and accommodating the coolant to be discharged through the thermostatic chamber 49 and around a thermal element 56 and out through an outlet fitting 57, shown as being threaded in the outlet end of the valve body 30.

The upstream edge of the shoulder 55 is shown as being engaged by a valve 60 operated by the thermal element 56. The valve 60 is shown as being in the form of an inverted cone, the conical face of which engages the inner margin of the shoulder 55 on the upstream side thereof to block the passage of fluid therethrough into the thermostatic chamber 49. The valve 60 has a stem 61 leading from the small diameter end thereof, and spun or otherwise secured to a bell-like spring retainer 63. The end of the stem 61 is shown as engaging a piston or power member 64 of the thermal element 56, and as being biased into engagement therewith as by a compression spring 65. The spring 65 is seated at its outer end on the annular end wall of the chamber 49 formed by the downstream side of the annular flange or shoulder 55 and at its inner end on the rim of the bell-like spring retainer 63. The thermal element 56 is a so-called wax or power type of thermal element, such as is shown and described in the Vernet Patent No. 2,368,181, dated January 30, 1945, and frequently referred to as a "Vernay" thermal element. In such types of thermostatic elements, a fusible material (not shown) which may be a wax alone, or a wax containing a powdered metal heat conductor and a binder, is carried in a casing 66 of the element and acts against a membrane or deformable member (not shown), to extend the piston or power member 64 from a cylinder 67 of the thermal element. The casing 66 is shown as being encircled by a metal ring 69 suitably secured thereto. The ring 69 abuts spaced end surfaces 70 of spaced sectors 71 of the fitting 56 and is retained thereto by the spring 65. The casing 66 is shown as fitting along the inner margin of the sectors 71 of the fitting 56, and as being subject to the flow of coolant passing thereover in the spaces between said sectors.

As the coolant passing through the by-pass passageway or pilot orifice 35 and into the chamber 49 under the control of the valve 44, reaches the temperature range for which the thermal element 56 is set, the piston or power member 64 will be extended from the cylinder 67, against the spring 65, to open the valve 60 and accommodate the coolant for the condenser to by-pass the valve 44 and pass directly through the outlet 57 of the valve body.

Upon operation of the compressor 10 and the refrigerating system, when the temperature of the cooling coils 13 reaches a predetermined value, the thermal element 20 will effect operation of the thermostatic switch 21 and complete a circuit to energize the coil 39 of the solenoid 22, to open the pilot valve 44.

The coolant for the condenser may then flow through the by-pass or pilot passageway 35 and the orifice of the flow control washer 46 into the thermostatic chamber 49, at a uniform flow rate regardless of pressure variations of the coolant at the source. Any temperature rise in the condenser coils 24 and the coolant flowing therethrough through the pilot valve 44, will be transferred to the casing 66 of the thermal element 56 and when the temperature rise reaches the operating temperature of said thermal element, the valve 60 will open, accommodating the through flow of coolant through the valve, and controlling the temperature of the condenser and increasing the efficiency of operation thereof, and thus controlling the head pressures on the compressor 10.

It may be seen from the foregoing that a novel and improved form of cooling system for water cooled condensers has been provided, in which the head pressures on the compressor and the flow of coolant through the condenser is controlled first by the temperature at the cooling coils and then by the temperature of the coolant flowing through the compressor, by the use of a simplified form of valve, including a pilot valve opening at a predetermined cooling temperature of the cooling coils, and passing warmed coolant around the thermal element, and effecting operation of the piston 64 to open the valve 60 upon a predetermined temperature rise in the coolant by-passed by the pilot valve to pass around the thermal element. The coolant may then flow from the condenser coil directly through the valve until the temperature of the coolant is reduced below the operating range of the thermal element 56, in which case the spring 65 will close the valve 60.

A valve of the type shown herein may deliver from $3/10$ to 5.6 G. P. M. at 20 lbs. pressure, starting at a 90° F., temperature and completely opening at a temperature of 102° F.

It should, of course, be understood that the temperature range of opening of the valve 60 may be varied to suit specific conditions required by varying the thermal element 56 and substituting therefor a thermal element operating at a higher or lower temperature range as required.

It should further be understood that while the valve of my invention is particularly adapted to control the flow of coolant for a condenser, that it may be used for various other purposes and particularly to control the flow of coolants and that various modifications and variations in the present invention may be effected without departing from the spirit and scope of the novel concepts thereof.

I claim as my invention:

1. In a closed referigerating system having a compressor, a condenser, a flow restrictor and cooling coils connected in a closed circuit, liquid cooling means for said condenser, and two thermostatic elements for controlling the head pressures of the compressor by controlling the flow of coolant along the condenser, one thermostatic element controlling the flow of coolant along the other in accordance with cooling coil temperature and the other controlling the discharge of coolant in accordance with the temperature thereof.

2. In a closed refrigerating system having a compressor, a condenser, a flow restrictor and cooling coils connected in a closed circuit, liquid cooling means for said condenser, and means for controlling the temperature of said condenser and the head pressure of said compressor comprising a thermostatically operated valve controlling the flow of coolant along said condenser, and a pilot valve opening in response to the temperature of the cooling coils, for controlling the passage of coolant through said valve.

3. In a closed refrigerating system having a compressor, a condenser, flow restricting means and cooling coils connected in a closed circuit, means for cooling said condenser by a liquid coolant, and valve means operated by the temperature at said cooling coils and the temperature of said condenser, for controlling the temperature of said condenser and the head pressure on the compressor comprising a thermally operated valve controlling the direct flow of coolant along said condenser, a thermal element controlling operation of said valve, and a pilot valve opening in accordance with a predetermined temperature of the cooling coils, for by-passing said first mentioned valve and passing coolant around said thermal element, to effect the opening of said first mentioned valve.

4. In a closed refrigerating system having a compressor a condenser, flow restricting means and cooling coils connected in a closed circuit, means for cooling said condenser by a liquid coolant, and valve means operated by the temperature at said cooling coils and the temperature of said condenser, for controlling the temperature of said condenser and the head pressure on the compressor comprising a thermally operated valve, a thermal element for opening the same upon predetermined temperature rises of the coolant for the condenser, a pilot valve by-passing said first mentioned valve and delivering a uniform volume of coolant to said thermal element to pass around the same regardless of pressure variations, a solenoid for opening said valve, a second thermal element adjacent the cooling coils, and a thermostatic switch operated by said second thermal element, for energizing said solenoid to open said pilot valve upon a predetermined temperature, to effect the opening of said first mentioned valve by the flow of heated coolant about said first mentioned thermal element.

5. A valve for controlling the flow of condenser coolant along a condenser by the temperature of the cooling coils of a refrigerating system and the temperature of the coolant passing along the condenser, comprising a valve body having an inlet and an outlet and a central chamber having communication with said inlet and said outlet, a valve controlling the passage of coolant into said chamber, means biasing said valve closed, a thermal element in said chamber for opening said valve upon certain predetermined temperature rises of the coolant, and pilot valve means by-passing said valve and supplying coolant to said chamber, for subjecting said thermal element to the temperature of the coolant and effecting the opening of said first valve upon predetermined temperature rises of the coolant.

6. A valve for controlling the flow of condenser coolant by the temperature of the cooling coils of a refrigerating system and the temperature of the coolant passing the condenser comprising a valve body having a chamber and an inlet and an outlet having communication with said chamber, a valve controlling the passage of coolant from said inlet into said chamber, a spring biasing said valve closed, a thermal element in said chamber having engagement with said valve for opening the same against the bias of said spring upon certain predetermined temperature rises of the coolant, and a substantially uniform flow delivery volume pilot valve by-passing said first mentioned valve and supplying coolant to said chamber independently of said first valve to effect the operation of said thermal element and opening of said first valve upon certain predetermined temperature rises of the coolant.

7. In a flow control valve for controlling the head pressures of the compressor of the refrigerating system by controlling the flow of condenser coolant through a liquid cooled condenser by the temperature of the cooling coils of a refrigerating system and the temperature of the coolant passing along the condenser in contact with the coils thereof, a valve body having an inlet and outlet and a central chamber having communication with said inlet and said outlet, a valve controlling the flow of fluid from said inlet into said chamber, a spring biasing said valve closed, a thermal element seated within said chamber and having a power member engaging said valve, for opening said valve against said spring upon certain predetermined temperature rises of the coolant, a pilot valve chamber in said valve body having a passageway leading therefrom into said chamber, and a by-pass passageway leading from said inlet to said pilot valve chamber, a resilient annular flow control member seated in said chamber having an orifice deformable upon increases in pressure of the coolant to effect a uniform flow of coolant therethrough, a pilot valve engageable with the orifice of said flow control member, for blocking the passage of fluid into said chamber, and means responsive to the temperature of the cooling coils for effecting the opening of said pilot valve, to supply coolant to said chamber to flow about said thermal element and effect the opening of said first mentioned valve upon predetermined temperature rises.

8. In a flow control valve for controlling the head pressures of the compressor of the refrigerating system by controlling the flow of condenser coolant through a liquid cooled condenser by the temperature of the cooling coils of a refrigerating system and the temperature of the coolant passing along the condenser in contact with the coils thereof, a valve body having an inlet and outlet and a central chamber having communication with said inlet and said outlet, a valve controlling the flow of fluid from said inlet into said chamber, a spring biasing said valve closed, a thermal element seated within said chamber and having a power member engaging said valve, for opening said valve against said spring upon certain predetermined temperature rises of the coolant, a pilot valve chamber in said valve body having a passageway leading therefrom into said chamber, and a by-pass passageway leading from said inlet to said pilot valve chamber, a resilient annular flow control member seated in said chamber having an orifice deformable upon increases in pressure of the coolant to effect a uniform flow of coolant therethrough, a pilot valve engageable with the orifice of said flow control member, for blocking the passage of fluid into said chamber, said pilot valve being formed on the armature of a solenoid, a spring biasing said armature and pilot valve in a valve closing direction, a coil for moving said armature and valve in a valve opening direction, and a thermostatically operated switch closing upon a predetermined temperature of the cooling coils for effecting the energization of said coil and the opening of said pilot valve, to by-pass fluid around said first valve and heat said thermal element to effect the opening of said first valve upon predetermined temperature rises of the coolant.

9. In a flow control valve for controlling the head pressures of a compressor of a refrigerating system by the temperature of the coolant flowing along a liquid cooled condenser and the temperature of the cooling coils of the refrigerating system, a valve body having an inlet, a central chamber and an outlet leading from said chamber, a pilot chamber spaced from said central chamber, a by-pass passageway leading from said inlet to said pilot chamber, a passageway leading from said pilot chamber to said central chamber, a first valve controlling the flow of coolant from said inlet to said central chamber, a power thermal element seated in said central chamber and having a cylinder having a piston extensible therefrom, having engagement with said first valve for opening the same upon predetermined rises in temperature, a spring for biasing said valve closed and returning said piston within said cylinder, a flow control annulus seated in said pilot chamber for delivering a uniform volume of coolant to said central chamber regardless of variations in pressure of the coolant at the source, a solenoid comprising an electromagnetic coil and an armature retractible within said coil upon energization of the same, a pilot valve on the end of said armature engageable with the central orifice passing through said flow control annulus for blocking the passage of coolant to said central chamber, means for energizing said electromagnetic coil and effecting the opening of said pilot valve comprising a thermal element responsive to a predetermined temperature of the cooling coils of the refrigerating system, and a switch operated by said second mentioned thermal element for effecting the energization of said solenoid upon a predetermined temperature of the cooling coils, to effect the heating of said thermal element by the by-pass of coolant past said first valve and effecting the opening of said first valve upon predetermined increases in temperature of the coolant.

10. In a coolant flow control valve comprising a valve body having an inlet and an outlet and a central chamber having communication with said inlet and said outlet, a valve controlling the passage of coolant into said chamber, means biasing said valve closed, a thermal element in said chamber for opening said valve upon certain predetermined temperature rises of the coolant, and pilot valve means by-passing said first mentioned valve and supplying coolant to said chamber, for subjecting said thermal element to the temperature of the coolant to effect the opening of said first valve upon predetermined temperature rises of the coolant.

11. In a flow control valve particularly adapted to control the flow of a cooling medium, a valve body having an inlet and an outlet and a central chamber having communication with said inlet and said outlet, a valve controlling the flow of fluid from said inlet into said central chamber, a spring biasing said valve closed, a thermal element seated within said chamber and having a power member engaging said valve, for opening said valve against said spring upon certain predetermined temperature rises of the coolant, a pilot valve chamber in said valve body having a passageway leading therefrom into said central chamber, a by-pass passageway leading from said inlet to said pilot valve chamber, a pilot valve in said pilot valve chamber, and means responsive to an external temperature condition to open said pilot valve to supply a cooling medium to said central chamber to flow about said thermal element.

12. In a flow control valve particularly adapted to control the flow of a cooling medium, a valve body having an inlet and an outlet and a central chamber having communication with said inlet and said outlet, a thermal element seated in said central chamber adjacent said outlet, a pilot valve chamber in said valve body, a passageway leading from said pilot valve chamber to said central chamber, a by-pass passageway leading from said inlet to said pilot valve chamber, a pilot valve in said chamber, means responsive to an external temperature condition to open said pilot valve to supply a cooling medium to said central chamber to flow about said thermal element, a valve controlling the direct flow of coolant from said inlet to said central chamber, and an operative connection between said thermal element and said valve.

References Cited in the file of this patent
UNITED STATES PATENTS

| | | |
|---|---|---|
| 1,408,453 | Goosman | Mar. 7, 1922 |
| 1,701,753 | Goosman | Feb. 12, 1923 |
| 1,854,402 | Goosmann | Apr. 19, 1932 |
| 2,368,181 | Vernet | Jan. 30, 1945 |
| 2,454,929 | Kempton | Nov. 30, 1948 |